(12) United States Patent　　　　　(10) Patent No.:　US 12,610,934 B2

Peterson　　　　　　　　　　　　　　(45) Date of Patent:　Apr. 28, 2026

(54) MOSQUITO TRAP AND METHOD OF USING THEREOF

(71) Applicant: Jesse Peterson, Fullerton, CA (US)

(72) Inventor: Jesse Peterson, Fullerton, CA (US)

( * ) Notice: Subject to any disclaimer, the term of this patent is extended or adjusted under 35 U.S.C. 154(b) by 0 days.

(21) Appl. No.: 18/830,203

(22) Filed: Sep. 10, 2024

(65) Prior Publication Data

US 2026/0068865 A1　Mar. 12, 2026

(51) Int. Cl.
| | |
|---|---|
| A01M 1/02 | (2006.01) |
| A01M 1/06 | (2006.01) |
| A01M 1/20 | (2006.01) |

(52) U.S. Cl.
CPC .............. A01M 1/02 (2013.01); A01M 1/06 (2013.01); A01M 1/2016 (2013.01)

(58) Field of Classification Search
CPC ........ A01M 1/06; A01M 1/2016; A01M 1/02; A01M 1/106; A01M 1/10; A01M 1/026; A01M 1/023; A01M 1/08; A01M 1/2055; A01M 1/00; A01M 1/2005; A01M 2200/012; A01M 2200/01; A01M 29/12; A01M 5/08
USPC .................................................. 47/122, 139
See application file for complete search history.

(56) References Cited

U.S. PATENT DOCUMENTS

| | | | | |
|---|---|---|---|---|
| 598,521 | A * | 2/1898 | Karr ...................... | A01M 1/106 43/121 |
| 668,775 | A * | 2/1901 | Herfert ................. | A01M 1/106 43/122 |
| 1,448,098 | A * | 3/1923 | Varga .................... | A01M 1/106 43/122 |
| 3,224,145 | A * | 12/1965 | Ballard ................... | A01M 1/20 43/131 |
| 5,193,302 | A * | 3/1993 | Rusco .................... | A01M 1/02 43/107 |
| 8,205,378 | B2 | 6/2012 | Banfield | |
| 10,813,349 | B1 | 10/2020 | Cheng | |
| 2003/0051391 | A1* | 3/2003 | Jablin ................... | A01M 1/023 43/139 |
| 2005/0274061 | A1 | 12/2005 | Zhu | |
| 2007/0074447 | A1 | 4/2007 | Kalogroulis | |

(Continued)

FOREIGN PATENT DOCUMENTS

WO　　　　2013082700 A1　　6/2013

*Primary Examiner* — Joshua J Michener
*Assistant Examiner* — Nicole Paige Maccrate
(74) *Attorney, Agent, or Firm* — Richard Eldredge; Leavitt Eldredge Law Firm

(57) ABSTRACT

A mosquito trap is disclosed herein that may be configured to have one or more mosquito attractants to lure such insects inside of the trap and kill them with one or more neutralizing mechanisms. The one or more mosquito attractants may include a plant that mosquitoes are attracted to and also a water reservoir tank that produces carbon dioxide, and yeast smell which mosquitoes may be attracted to such gas. The one or more neutralizing mechanisms may include a toxin in the water reservoir tank, such as a larvicide, that neutralizes mosquito eggs, larvae, and possibly the mosquitoes themselves. Also, the one or more neutralizing mechanisms may include a fan system that creates a suction airflow pulling the mosquitoes inside the trap and towards the rotating blades of the fan to collide there with and be killed or pulled down bellow to vents to be dried.

8 Claims, 6 Drawing Sheets

(56)                    References Cited

U.S. PATENT DOCUMENTS

| | | |
|---|---|---|
| 2018/0288992 A1 | 10/2018 | Gallegos |
| 2019/0150422 A1* | 5/2019 | Welch .................... A01M 1/223 |
| 2019/0335737 A1* | 11/2019 | Dolshun .................. A01G 9/02 |
| 2020/0196587 A1 | 6/2020 | Smith |
| 2022/0079131 A1 | 3/2022 | Kaye |

* cited by examiner

100

MOSQUITO TRAP AND METHOD OF USING THEREOF

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various aspects and embodiments described herein relate to a mosquito trap and method of using thereof.

Mosquitoes, specifically female mosquitoes, are known to bite humans and animals and suck their blood in order to be capable of reproducing. Such biting and blood sucking may irritate a person's skin and may also transfer diseases to the person, such as malaria and the Zika virus. As a result, mosquitoes may be a nuisance and even a danger to humans and animals.

Accordingly, there is a need in the art for an improved device, system, and method for neutralizing mosquitoes.

BRIEF SUMMARY

The various embodiments and aspects disclosed herein address the needs discussed above, discussed below and those that are known in the art.

A mosquito trap is disclosed herein that may be configured to have one or more mosquito attractants to lure such insects inside of the trap and kill them with one or more neutralizing mechanisms. The one or more mosquito attractants may include a plant that mosquitoes are attracted to and also a water reservoir tank that produces carbon dioxide, yeast scent, and mosquito larvae scent which mosquitoes may be attracted to. The one or more neutralizing mechanisms may include a toxin in the water reservoir tank, such as a larvicide, that neutralizes mosquito eggs, larvae, and possibly the mosquitoes themselves. Also, the one or more neutralizing mechanisms may include a fan system that creates a suction airflow pulling the mosquitoes inside the trap and towards the rotating blades of the fan to collide there with and be sucked into the lower vents killing them. The fan also blows the attractant through the exhaust vents into air currents to attract mosquitoes from a greater distance due to their feeding range of 1-3 miles and not just nearby the mosquito trap. Consequently, not only the nearby mosquitoes are attracted to the device, but the mosquito trap may be designed to attract and kill mosquitoes from a greater distance range. Overall, the mosquito trap may prevent people and animals from being bit by mosquitoes and mitigate the spread of diseases such as, malaria, Zika virus, yellow fever, chikungunya fever, dengue fever, West Nile virus, Saint Louis encephalitis virus, La Crosse encephalitis virus, and other arboviruses and diseases transmitted by mosquitoes.

More particularly, a mosquito trap is disclosed that may have a storage body having a first chamber with a first volume and a second chamber with a second volume, the first chamber being fluidly connected to an outside environment of the storage body by one or more air inlets proximate to a top portion of the storage body, the first chamber being fluidly connected to the second chamber, the second chamber being fluidly connected to the outside environment by one or more exhaust vents proximate to a bottom portion of the storage body, a mosquito attracting plant sticking out of the storage body, the mosquito attracting plant being proximate to the one or more air inlets, a water tank inside the first chamber of the storage body, the water tank having a fluid mixture made of water, an attractant substance for attracting mosquitoes, and a toxin for neutralizing larvae of the mosquitoes, and a fan in the storage body and below the water tank, the fan configured to create a suction airflow from the one or more air inlets to the one or more exhaust vents.

In some embodiments, the second chamber is within the first chamber. In some embodiments, the water tank is above the second chamber.

In some embodiments, the one more air inlets are located on a lid placed on top of the storage body. In some embodiments, the one or more air inlets are a plurality of air inlets surrounding the mosquito attracting plant.

In some embodiments, the fan is in the second chamber.

In some embodiments, the mosquito attracting plant is either a papyrus plant, or a taro plant.

In some embodiments, the fan is an inline fan and is waterproof.

Furthermore, a method of assembling a mosquito trap is disclosed that may include providing a storage body a first chamber with a first volume and a second chamber with a second volume, the first chamber being fluidly connected to an outside environment of the storage body by one or more air inlets proximate to a top portion of the storage body, the first chamber being fluidly connected to the second chamber, the second chamber being fluidly connected to the outside environment by one or more exhaust vents proximate to a bottom portion of the storage body, providing a fan having a plurality of rotatable blades, the fan being inside the storage body and configured to create a suction airflow from the one or more air inlets to the one or more exhaust vents, placing a water tank inside the first chamber of the storage body, pouring water inside the water tank, pouring an attractant substance for attracting mosquitoes in the water tank, and pouring a toxin for neutralizing larvae of the mosquitoes in the water tank, wherein when the fan is turned on, the suction airflow created by the fan suctions mosquitoes inside the storage body and towards the fan to collide with plurality of rotatable blades that are rotating and are then sent into the vents below.

In some embodiments, the method may further include mounting a mosquito attracting plant sticking out of the storage body.

In some embodiments, the attractant substance produces $CO_2$.

In some embodiments, the toxin includes at least one of BTI, pyrethroid, pyrethrums, Methoprene, temephos, dish soap, shampoo, boric acid, garlic oil, peppermint oil, vegetable/olive oil, or apple cider vinegar.

Additionally, a mosquito trap is disclosed that may have a storage body having a first chamber and a second chamber, the first chamber being fluidly connected to an outside environment of the storage body by one or more air inlets proximate to a top portion of the storage body, the second chamber being within the first chamber and fluidly connected with the first chamber, the storage body also having an exhaust chamber below the first and fluidly connected to the second chamber, the exhaust chamber being fluidly connected to the outside environment by one or more exhaust vents proximate to a bottom portion of the storage body, a water tank inside the first chamber of the storage body, the water tank having a fluid mixture made of water, an attractant substance for attracting mosquitoes, and a toxin for neutralizing larvae of the mosquitoes, and a fan in the second chamber of the storage body and below the water tank, the fan configured to create a suction airflow from the one or more air inlets to the one or more exhaust vents.

In some embodiments, the mosquito trap may have a solar panel outside of the storage body.

In some embodiments, the attractant substance produces CO2.

In some embodiments, the attractant substance includes at least one of yeast, or sugar.

In some embodiments, the toxin includes at least one of BTI, pyrethroid, pyrethrums, Methoprene, temephos, dish soap, shampoo, boric acid, garlic oil, peppermint oil, veg-etable/olive oil, or apple cider vinegar.

In some embodiments, the mosquito trap has a mosquito attracting plant sticking out of the storage body from the first chamber, the mosquito attracting plant being proximate to the one or more air inlets.

In some embodiments, the fan in the second chamber is waterproof.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2A:
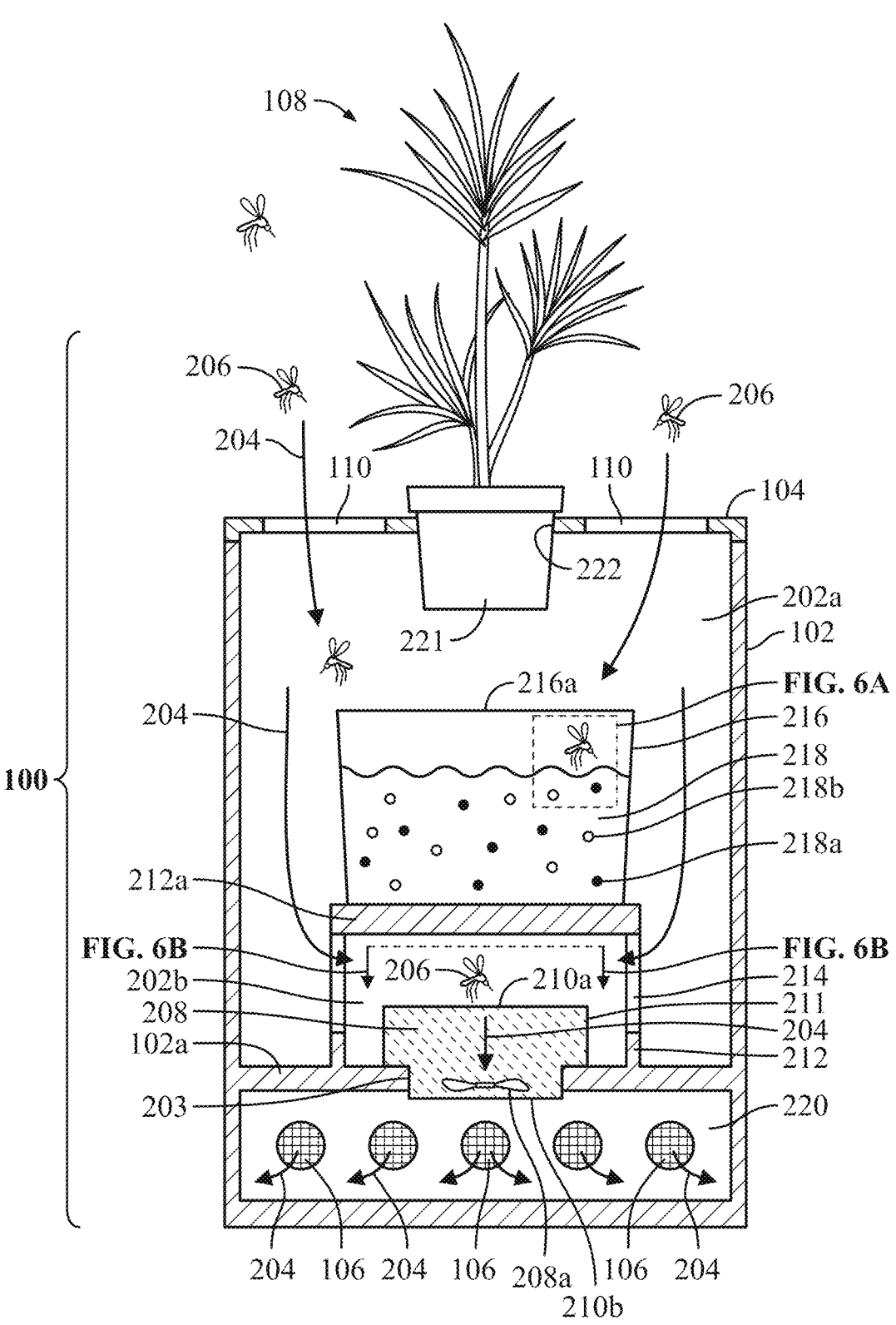
FIG. 2A shows a cross-sectional view of the mosquito trap in operation and also the internal components of the device.

Referring now to the figures, and as shown in FIG. 2A, mosquitoes 206 tend to be attracted to certain plants 108, stationary water 218, and carbon dioxide that may be produced by attractant mixing substances 218a in the water 218. The mosquito trap 100 may be configured to have one or more of such mosquito attractants and even transmit and vent such attractants to the surrounding area of the trap to attract mosquitoes 206 from greater distances (e.g., one to three miles). The mosquito trap 100 may also have one or more mechanisms to neutralize and kill the attracted mos-quitoes 206 and any eggs 206a (see FIG. 6A) or larvae 206b they lay within the device. The mosquito trap 100 may have a fan system 208 that suctions the flying mosquitoes 206 inside the mosquito trap 100 and towards the blades 208a (see FIG. 6B) of the fan system 208 to kill the mosquitos 206. The mosquito trap 100 may have a water reservoir tank 216 having stationary water 218 with attractant substance 218a mixed therein to attract the mosquitoes 206 and toxins 218b also mixed in the stationary water 218 to neutralize and kill the larvae 206b (see FIG. 6A), eggs 206a, and in some cases the mosquitoes 206 as well. The mosquito trap 100 may be used either indoors or outdoors, where a smaller sized mosquito trap 100 may be preferred for indoor usage and a larger sized mosquito trap 100 may be preferred for outdoor usage.

Figure 1:
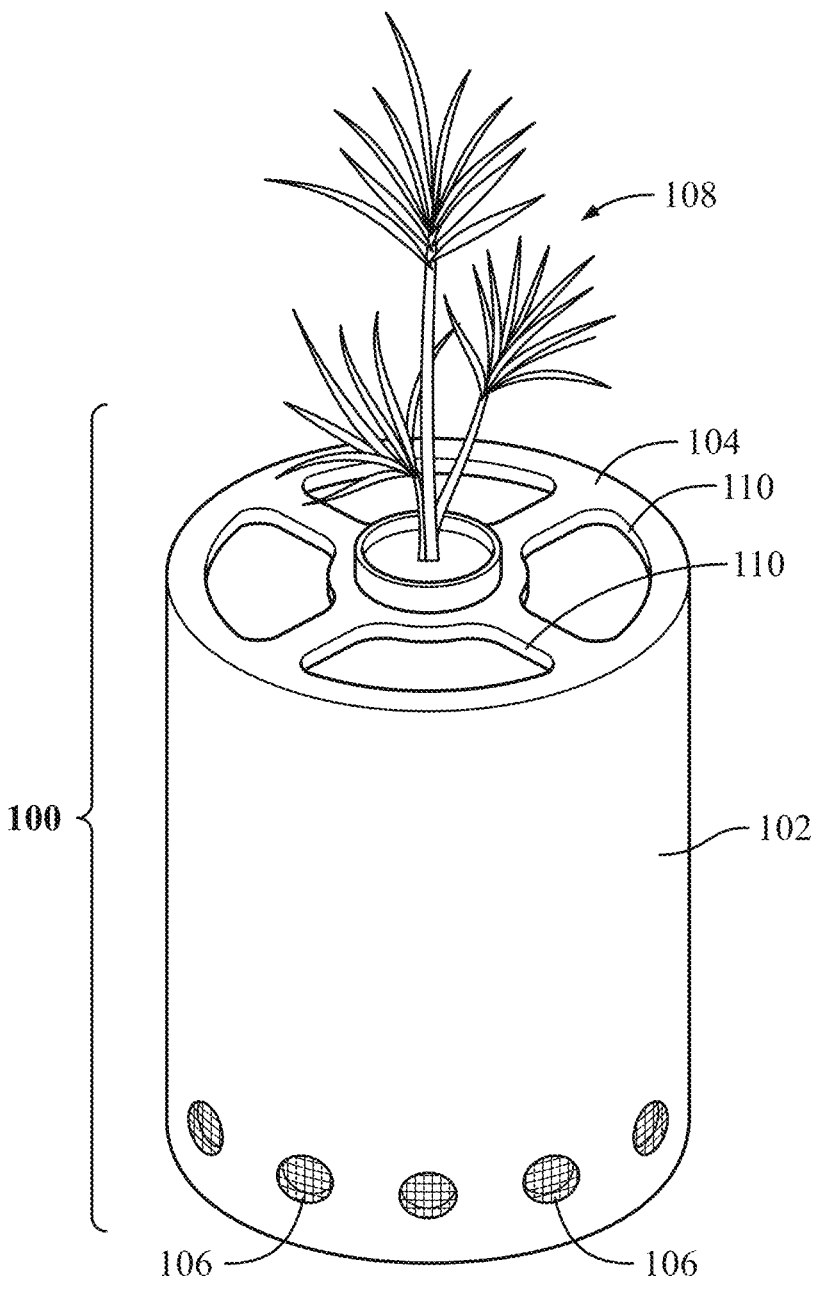
FIG. 1 shows a perspective view of the mosquito trap.

Referring now to FIG. 1, a perspective view of the mosquito trap 100 is shown. The outside of the mosquito trap 100 may be defined by a storage body 102 having a lid 104 removably attached thereon. As shown in FIG. 2a, the storage body 102 may have one or more chambers 202a-b configured to trap and kill mosquitoes 206. The inside of the storage body 102 may also have a fan system 208 that creates suction flow 204 pulling mosquitoes 206 inside the one or more chambers 202a-b and the exhaust chamber 220 as well. The bottom section of the storage body 102 having the exhaust chamber 220 may be fluidly connected to the outside by one or more exhaust vents 106 that allow the suction flow 204 flow from the top of the storage body 102 down to its bottom. The inside of the storage body 102, specifically the first chamber 202a, may have a water reservoir tank 216 filled with standing water, for example, to attract mosquitoes 206 to enter the storage body 102.

Figures 2B, 3:
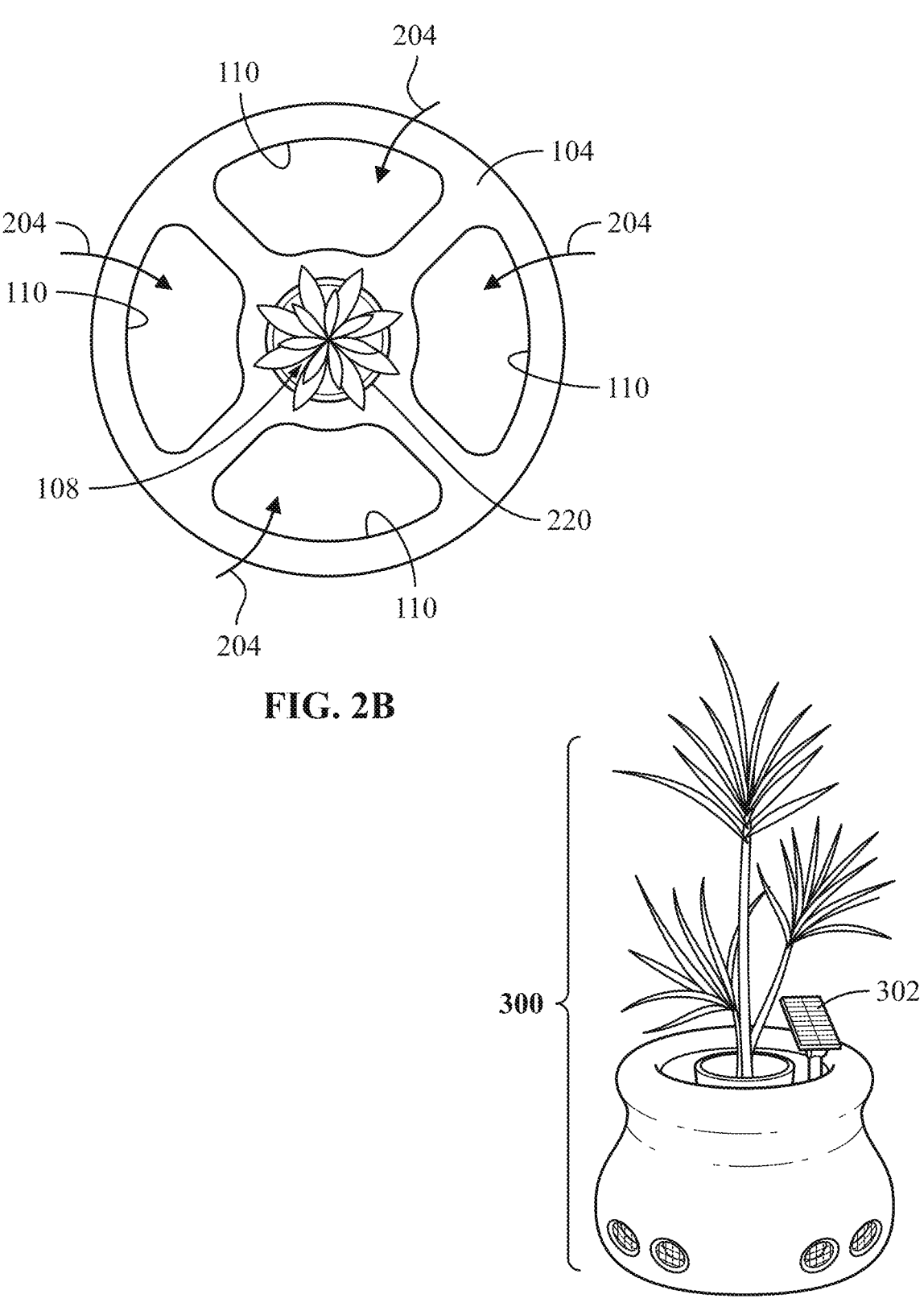
FIG. 2B shows a top view of the mosquito trap.
FIG. 3 shows a perspective view of another example of the mosquito trap.

As shown in FIG. 1, a lid 104 may be removably attached on top of a storage body 102 to allow a user to access the inside chambers of the mosquito trap 100. The lid 104 may have one or more inlets 110 to allow airflow 204 (see FIG. 2A) and mosquitoes 206 to enter the storage body 102. The airflow 204 traversing into the storage body 102 may also create the necessary fluid flow for the fan system 208 to vent out and spread mosquito attractants through the exhaust vents 106 to the outside environment to attract mosquitoes 206 towards the mosquito trap 100. Such attractants may be carbon dioxide from the water reservoir tank 216 and the smell of the mosquito attractant plant 108. The mosquito attractant plant 108 may be in the center of the lid 104 and between the plurality of inlets 110, as shown in FIG. 2B, where the pot 221 of the plant (see FIG. 2A) may be inserted in a center hole 222 of the lid 104 and the plant itself may be on top of the mosquito trap 100. By way of example and not limitation, the lid 104 may have between one to 12 air inlets 110 surrounding the mosquito attractant plant 108.

As shown in FIG. 2A, the first layer of attracting mos-quitoes 206 to the mosquito trap 100 may be the mosquito attracting plant 108. Mosquitoes 206 may be attracted to plants 108 holding large amounts of water, particularly in the leaves of the plants, and that grow in damp vegetations. Such types of plants 108 may also grow near standing water and may provide cover for the mosquitoes 206 when laying eggs and reproducing. Optionally, mosquitoes 206 may also be attracted to such plants 108 because they may produce a specific scent. Mosquitoes 206 may be attracted to such scents of the plants 108 since they are naturally and bio-logically attracted to mosquito attracting plants.

The mosquito attracting plant 108 may be in a pot 221 (see FIG. 2A) that is coupled within a center insertion hole 222 of the lid 104. The mosquito attracting plant 108 may also be surrounded by air inlets 110 that open into the first chamber 202a of the mosquito trap 100, as shown in FIG. 2B. As such, the mosquitoes 206 may get sucked into the first chamber 202a, by the suction flow 204 created by the fan 208, when such insects fly towards the mosquito attract-ing plant 108. The mosquito attracting plant 108 may be outside and above the storage body 102 for the mosquitoes 206 to sense (e.g., olfactory and visually) and fly towards the plant and the air inlets 110. When the mosquitoes 206 come close to the plant 108, they may get pulled inside the storage body 102 by the suction flow 204.

By way of example and not limitation, the mosquito attracting plant 108 may be a papyrus plant. Papyrus plants may have watery leaves and have a biological scent that attracts mosquitoes 206. By way of example and not limitation, the mosquito attracting plant 108 may be a taro plant. The taro plant may have watery leaves, and are biologically ingrained in the mosquitoes dna to attract them to it. The soil in the pot 221 that the aforementioned plants are in may also be moist and muddy to further attract mosquitoes 206 since such insects are attracted to damp environments.

In other examples, the plant pot 221 may be replaced with a second water reservoir tank to utilize mosquito attracting plants 108 that are grown in water. In other examples, a second layer of mosquito attracting plants 108 that are grown in water may be placed on top of the stationary water 218 in the water reservoir tank 216 (see FIG. 2A) to add a second layer of plants that attract mosquitoes 206. By way of example and not limitation, such water plants may be water lilies, water hyacinth, and water lettuce, to name some examples. Some or all of these water plants may provide covering for the mosquitoes 206 when they are reproducing and laying eggs.

In addition to the mosquito attracting plant 108, the mosquito trap 100 may have a water reservoir tank 216 filled with stationary water (e.g., standing water) inside the first chamber 202*a* of the device. The water reservoir tank 216 and the content within it may act as a second layer of attracting mosquitoes 206 to the mosquito trap 100 and neutralize and kill them. The water reservoir tank 216 may be inside the first chamber 202*a* and rest on top of the roof 212*a* of the second chamber 202*b* that is within the first chamber 202*a*. The water tank 216 may be a separate component from the roof 212*a* of the second chamber 202*b* or may be integrated and unitarily formed with the roof. The water tank 216 may have an open top 216*a* exposing the upper surface of the water mixture 218 therein. The water tank 216 may be wide enough such that the open top 216*a* and the water mixture 218 may overlap horizontally with the air inlets 110 (see FIG. 2A) so that mosquitoes can sense (e.g., olfactory, sight, and CO2 receptors) the content of the water mixture 218 from above and outside of the inlets 110. By way of example and not limitation, the water tank 216 may hold between ½ to 12 gallons of fluid, such as the water mixture 218. In other examples, the water tank 216 may hold greater than 12 gallons of fluid. In some examples, the water tank 216 may replace and be positioned where the attractant plant 108 is positioned, on top and between the air inlets 110, for the tank to better attract mosquitoes.

By way of example and not limitation, the water tank 216 may be fluidly connected to a second water tank that regenerates the water tank 216 with stationary water 218. The stationary water 218 in the primary water tank 216 may evaporate quickly due to the airflow 214 created by the fan 208 suctioning evaporated water from the water tank. Consequently, the secondary water tank may refill the primary water tank 216 with water to keep the water level the same. By way of example and not limitation, the secondary water tank may collect rainwater. By way of example and not limitation, the secondary water tank may have stationary water 218 with attractant substance 218*a* (e.g., instant yeast) and toxic substances 218*b* (e.g., BTI) mixed therein.

Figure 6A:
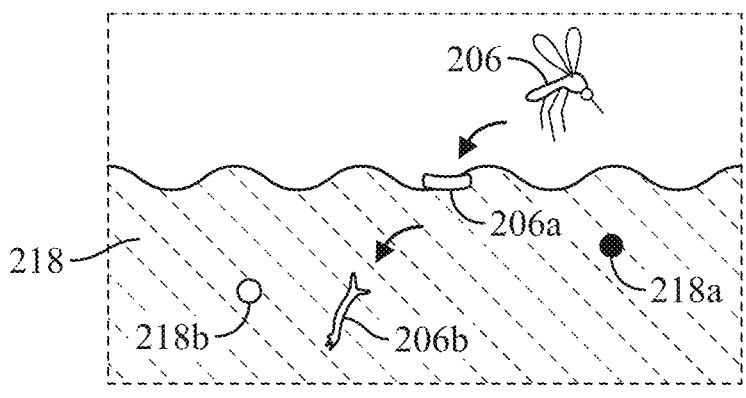
FIG. 6A shows a close-up view of the water tank of FIG. 2A.
Figure 6B:
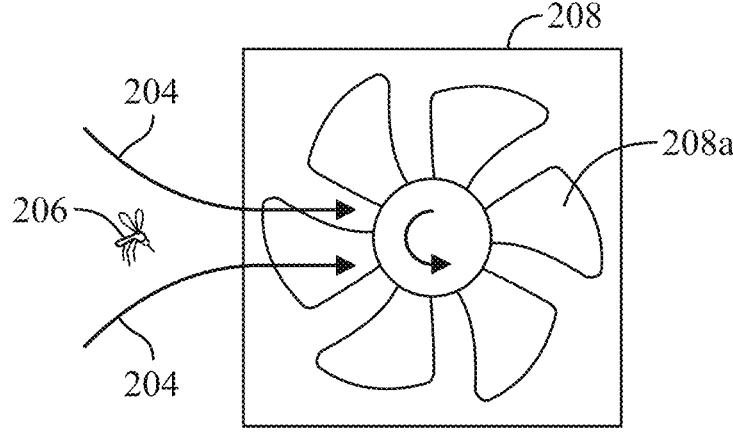
FIG. 6B shows a top view of the fan system of FIG. 2A.

As shown in FIG. 6A, mosquitoes 206 may use the stationary water 218, having a mixture of substances 218*a-b* within, to lay eggs 206*a* and reproduce. Consequently, the mosquitoes 206 may be attracted to fly inside the first chamber 202*a* to land and reproduce on the water 218. Mosquitoes 206 may be attracted to carbon dioxide because humans and animals produce such gas, and mosquitoes 206 feed off of the blood of humans and animals. As such, mosquitoes 206 may have carbon dioxide receptors to track sources producing such gas. Consequently, the water 218 may have one or more substances 218*a* that produce carbon dioxide, mixed therein, to further attract the mosquitoes 206 to the water tank 216. As described elsewhere herein, the water 218 may also have one or more substances 218*b* that are toxic to the larvae 206*b*, eggs 206*a*, and even the mosquitoes 206 themselves to neutralize and kill them and prevent them from leaving the water tank 216.

By way of example and not limitation, the attractant substance 218*a* mixed in the water 218 in the water tank 216 may be natural ingredient substances. Natural ingredient substances may allow for the mosquito trap 100 to be environmentally friendly. Alternatively, the attractant substances 218*a* may be synthetic substances. By way of example and not limitation, the attractant substance 218*a* mixed in the water 218 in the water tank 216 may be yeast since yeasty smelling water attracts mosquitoes. The yeast may also react with water to produce carbon dioxide. By way of example and not limitation, the yeast may be instant yeast. Sugar, such as brown or cane sugar, may be added to such mixture of yeast and water, and be part of the attractant substances 218*a*, to create carbon dioxide. By way of example and not limitation, the attractant substances 218*a* mixed in the water 218 in the water tank 216 may be yeast and sugar since such mixture may react with water to produce carbon dioxide. In other examples, the vinegar may be replaced with lemon juice. Other acidic substances (e.g., citric acid) are also contemplated herein to be mixed with baking soda and water to make carbon dioxide. Alternatively, the water tank 216 may be replaced by a carbon dioxide generating machine 405 controlled by a microcontroller 402, as described elsewhere herein. In some examples, the carbon dioxide generating machine 405 may be similar to the ones used for enhancing plant growth. As described elsewhere herein, the fan system 208 (see FIG. 2A) may vent the produced CO2 and/or the attractive smells to the outside environment to attract mosquitoes to the mosquito trap 100.

The attractant substances 218*a* may attract the mosquitoes 206 to the water mixture 218 and the toxic substances 218*b* may neutralize and kill the eggs 206*a* and larvae 206*b* the mosquitoes 206 lay in the water tank 216. In some examples, the toxic substances 218*b* may also neutralize and kill the mosquitoes 206 themselves as well. By way of example and not limitation, the toxic substances 218*b* mixed in the water 218 in the water tank 216 may be natural ingredient substances. Natural ingredient substances may allow for the mosquito trap 100 to be environmentally friendly. Alternatively, the toxic substances 218*b* may be synthetic substances. By way of example and not limitation, the toxic substances 218*b* mixed in the water 218 may be larvicide. By way of example and not limitation, the toxic substances 218*b* mixed in the water 218 of the water tank 216 may be one or more of *Bacillus thuringiensis* serotype israelensis (BTI), pyrethroid or pyrethrums, Methoprene, temephos, dish soap, shampoo, boric acid, garlic oil, peppermint oil, vegetable/olive oil, apple cider vinegar, table salt, and copper concentrate.

To make the water mixture 218, one or more of the attractant substance 218*a*, described elsewhere herein, may be combined with one or more of the toxic substances 218*b*, described elsewhere herein. Some examples may include mixing yeast, BTI, and water. Other examples may include mixing yeast, sugar, garlic oil, and water. Other examples may include mixing baking soda, vinegar, dish soap, and water. However, the aforementioned examples are nonlimiting and any of the substances, described elsewhere herein, may be combined to make the required attractant and neutralizing fluid mixture.

By way of example and not limitation, the mosquito trap 100 may have a container connected to the water tank 216 that automatically adds attractant substances 218a (e.g., instant yeast and sugar) to the stationary water 218 when the mixture inside the tank runs low. By way of example and not limitation, the mosquito trap 100 may have a container connected to the water tank 216 that automatically adds toxic substances 218b (e.g., BTI) to the stationary water 218 when the mixture inside the tank runs low. By way of example and not limitation, such containers may be connected to the microcontroller 402 of FIG. 4.

By way of example and not limitation, the water of the water mixture 218 may be fresh water, where such fresh water may be standing water from leftover rainwater, water from lake or pond, or artificially created standing water. Mosquitoes 206 may be attracted to standing water for reproduction. In other examples, the fresh water of the water mixture 218 may be tap water. By way of example, the water mixture 218 may have a temperature between 50 to 100 degrees Fahrenheit. The water temperature range of 70 to 90 degrees Fahrenheit may be optimum for the mosquitoes 206 to reproduce, which such water temperature range may further attract such insects to the water tank 216. In some examples, the water mixture 218 may also have a pH between six to 7.5 to further attract the mosquitoes 206 to fly downward in the first chamber 202a and to the water tank 216 to reproduce. In other examples, the water mixture 218 may have a pH less than or equal to three or a pH greater than or equal to 12 to prevent the eggs 206a laid by the mosquitoes 206 on the water to develop further into larvae 206b.

As shown in FIG. 2A, the fan system 208 may be below the attractant plant 108 and the water tank 216 to fan out the scent and carbon dioxide, produced by such attractant mechanisms, to the outside environment of the mosquito trap 100 to attract mosquitoes 206. The fan system 208 may create a downward airflow 204 from the top of the device that may carry the scent of the attractant plant 108 inside towards the first chamber through the air inlets 110. The downward airflow 204 may then flow under the water tank 216 and into the second chamber 202b carrying the carbon dioxide produced from the water tank 216, in addition to the scent of the plant 108, towards the fan inlet 210a. The fan outlets 210b may exhaust the carbon dioxide and the scents (e.g., from the plant 108 and from the water tank 216) in an exhaust chamber 220 that has exhaust vents 106 proximate to the bottom of the storage body 102. The exhaust vents 106 may disperse the scents and the carbon dioxide to the surrounding area of the mosquito trap 100 to attract mosquitoes 206.

Referring again to FIG. 2A, the airflow 204 also acting as a suction force pulling the mosquitoes 206 into the mosquito trap 100 will now be discussed. The fan system 208 may create a suction airflow 204 that the mosquitoes 206 cannot overcome, which such flow may pull such insects downwards into the device and towards the rotating blades 208a (see FIG. 6B) of the fan system 208 for collision and sending them into the lower vents for neutralization. As described elsewhere herein, the suction airflow 204 may also be responsible for dispersing attractant scents and carbon dioxide of the attractant mechanisms through the exhaust vents 106 of the device. As described elsewhere herein, the fan settings and the suction airflow 204 may change between nighttime and daytime since mosquitoes 206 may be nocturnal insects, and the fan system 208 may need to be active during the nighttime more.

The second chamber 202b between the first chamber 202a and the exhaust chamber 220 may have a fan system 208, for example an inline fan, that creates the suction airflow 204 from the air inlets 110 on top of the device to the exhaust vents 106 at the bottom of the mosquito trap 100. When mosquitoes 206 fly near the vicinity or into the mosquito trap 100, due to being attracted to the plant 108 or water tank 216, their wings may be too weak to overcome the suction airflow 204 created by the fan 208. Consequently, the mosquitoes may get trapped by the suction force and move in the same direction as the airflow 204 moving towards the rotating blades 208a (see FIG. 6B) of the fan 208. The mosquitoes 206 may collide with the rotating blades 208a of the fan 208 and be killed. The rotating blades 208a may also pull the mosquitoes 208, who some may not be dead, into the exhaust chamber 220 under the first and second chambers 202a-b. In the exhaust chamber 220, the mosquitoes 208 that did not die by the rotating blades 208a may be crushed by the force of the airflow 204 exerted on them and pressing the mosquitoes 206 to the walls and ground of the exhaust chamber or dried out in the vents below 220. As described elsewhere herein, the exhaust vents 106 may have mesh wirings with small openings that do not let the mosquitoes 206 to exit out of the exhaust chamber 220 through the vents 106.

The inline fan 208 via its fan inlet 210a may direct airflow 204 from the air above the lid 104 through the air inlets 110 and towards the second chamber 202b, where the fan 208 may be located. The outside air may flow inside the first chamber 202a and down to the second chamber 202b that is fluidly connected to the first chamber 202a. The strength of the suction air flow 204 may gradually increase moving from the top of the first chamber 202a and into the second chamber 202b. Such gradual increase in the suction force may help reel in the mosquitoes 206 more efficiently than an abrupt increase in suction force. On the outside of the air inlets 110, where the suction airflow 204 may relatively be weak, mosquitoes 206 may willingly follow along the relatively gentle airflow 204 inside the first chamber 202a. The willing following of the airflow 204 by the mosquitoes 206 inside the first chamber 202a may be especially true since the water tank 216, providing carbon dioxide and a reproduction environment, may be located in the first chamber 202a (e.g., in the middle or top portion of the chamber).

As the mosquitoes 206 follow the airflow 204 and fly down the first chamber 202a, the suction force of the airflow may increase to a point where such insects may find escaping the airflow 204 hard due to their weak wings and flying power. As the mosquitoes 206 are forced to fly further down the first chamber 202a and near the second chamber 202b, then the suction force may not allow the mosquitoes 206 to fly away. Consequently, the mosquitoes 206 are pulled into the second chamber 202b and into the fan 208 to collide with its rotating fan blades 208a then get sent into the vents below and die. The mosquitoes that do not die by the fan blades 208a may still get killed by being pressed and crushed against the walls and grounds of the exhaust chamber 220 by the suction force of the fan 208. The gradual increase in the suction airflow 204 force may be due to coming closer to the fan 208 and also the decrease in volume of the second chamber 202b relative to the first chamber 202a. The suction airflow 204 force may be much greater in the second chamber 202b because of its smaller volume and space relative to the first chamber 202a.

The structural features of the mosquito trap 100 that trap and kill the mosquitoes 206 using the fan system 208 will now be discussed. Referring again to FIG. 2A, such structural features may include the first chamber 202*a*, the second chamber 202*b*, the fan system 208, and the exhaust chamber 220 of the mosquito trap 100. The first chamber 202*a*, the second chamber 202*b*, and the exhaust chamber 220 may be fluidly connected to each other, where the fan system 208 may create the suction airflow 204 therethrough.

The first chamber 202*a* may make up the majority of the inner volume of the storage body 102 of the mosquito trap 100. The first chamber 202*a* may be fluidly connected directly to the outside of the device by the air inlets 110 on the lid 104 and on the top edge of the first chamber 202*a*. The pot 221 of the plant 108 may stick inside the first chamber 202*a* via the center hole 222 to be secured to the device. The second chamber 202*b* may be within the first chamber 202*a*, where the two chambers 202*a*-*b* may be separated from each other by the enclosure 212 of the second chamber 202*b*. The first chamber 202*a* may also contain the water tank 216, described elsewhere herein. The water tank 216 may be on top of the roof 212*a* of the enclosure 212, defining the second chamber 202*b*, and consequently be elevated in the first chamber 202*a* to be closer to the air inlets 110 and visible to the mosquitoes 206. The first chamber 202*a* may have the exhaust chamber 220 thereunder, where the two chambers may be divided by a partition 102*a*. The exhaust chamber 220 may occupy the same horizontal dimensions as the first chamber 202*a*.

By way of example and not limitation, the total internal volume of the first chamber 202*a* may be between one to 10 cubic feet. In some examples, the total internal volume of the first chamber 202*a* may be greater than 10 cubic feet. By way of example and not limitation, the height of the internal volume of the first chamber 202*a* may be between two to six feet. In some examples, the height of the internal volume of the first chamber 202*a* may be greater than six feet. A greater internal volume and height of the first chamber 202*a* may allow for more space to trap mosquitoes 206 and allow for a bigger water tank 216 placed therein to also attract more mosquitoes 206. A smaller internal volume and height of the first chamber 202*a* may allow for the fan 208 to create a stronger suction flow 204 inside the first chamber 202*a*.

The second chamber 202*b* may be located within and at the center of the first chamber 202*a*. Alternatively, the second chamber 202*b* may not be within the first chamber 202*a* and be thereunder. The second chamber 202*b* may have a fraction of the internal volume of the first chamber 202*a* and occupy a fraction of the horizontal and vertical dimensions that the first chamber 202*a* occupies. The internal volume of the second chamber 202*b* may still be large enough to hold the fan system 208 and have horizontal and vertical free space for fluid flow. By way of example and not limitation, the second chamber 202*b* may have between ⅙ to ½ of the internal volume and height of the first chamber 202*a*, described elsewhere herein. In some examples, the second chamber 202*b* may have greater than ½ of the internal volume and height of the first chamber 202*a*, and in other examples the second chamber may have less than ⅙ of the internal volume and height of the first chamber 202*a*.

The second chamber 202*b* may have a rectangular enclosure 212 with a roof 212*a* and a plurality of second inlet openings 214 on the sidewalls of the enclosure 212. The second inlet openings 214 may allow for fluid connection between the first and second chambers 202*a*-*b*. Consequently, the fan 208 may create the suction airflow 204, described elsewhere herein, traversing through the second inlet openings 214 (on the sides of the enclosure 212) and through the bottom duct opening 203 in the second chamber 202*b*. The bottom duct opening 203 may be created in a portion of the partition 102*a* that is within the second chamber 202*b*.

By way of example and not limitation, the fan system 208 may be made of one or more inline fans 208. The inlet 210*a* of the fan system 208 and the one or more fans may face the ceiling of the roof 212*a* of the second chamber 202*b*. In other examples, the inlet 210*a* of the fan system 208 and the one or more fans may face the side inlet openings 214 of the second chamber 202*b* to create better air flow 204 between the chambers, described elsewhere herein. The outlet 210*b* of the fan system 208 and the one or more fans may face and be within the bottom duct 203 between the second chamber 202*b* and the exhaust chamber 220. Consequently, the outlet 210*b* of the fan system 208 and the one or more fans may face inside of the exhaust chamber 220.

By way of example and not limitation, the fan system 208 may have between one to eight fans. In some examples, the fan system 208 may have greater than eight fans. By way of example and not limitation, the one or more fans making up the fan system 208 may each be an axial fan, a mixed flow fan, a centrifugal fan, or a combination of thereof. By way of example and not limitation, the one or more fans making up the fan system 208 may each be an axial inline fan, a mixed flow inline fan, a centrifugal inline fan, or a combination of thereof. The one or more fans may also be water-resistant or waterproof such that the electric components of such fans are protected from water exposure, such as from the mosquitoes that are suctions from the water tank 216.

The one or more fans of the fan system 208 may have variable speed and power that may be adjusted. For example, the fan system 208 may operate under low, medium, and high speed and power, which determines the suction force of the airflow 204 (low-speed creating lower suction force and high-speed creating high suction force). The turning on and off and the adjustment of speed and power of the fan system 208 may be done manually or may be done automatically by a microcontroller or central processing unit 402 (see FIG. 4), as described elsewhere herein. The activation of the fan system 208 and its speed and power adjustment may be configured to vary throughout daytime and nighttime, as described elsewhere herein, since most mosquitos' species are nocturnal insects.

By way of example and not limitation, the one or more fans making up the fan system 208 may each be configured to displace between 200 to 800 cubic feet per minute (CFM) of air. The low end of the CFM range may be good for not disturbing the flying patterns of the mosquitoes 206 and allow them to get closer to the mosquito trap 100 and into the inner chamber 202*a* to be trapped. The high end of the CFM range may be good for creating a stronger suction flow 204 to trap mosquitoes 206 farther away from the fan system 208, and even from the outside of the mosquito trap 100. The high end of the CFM range may also be good for venting out the attractant scents and carbon dioxide, described elsewhere herein, to reach a greater range outside the mosquito trap 100 to attract more mosquitoes to the trap.

The exhaust chamber 220 may be under the first and second chambers 202*a*-*b* and separated from such chambers by a partition 102*a*. The partition 102*a* may have a duct 203 that is within the second chamber 202*b* to fluidly connect the exhaust chamber with the second chamber 202*b*, where the outlet 210*b* of the fan 208 may face towards and be between the bottom duct 203. The exhaust chamber 220 may be fluidly connected to the outside environment via one or more exhaust vents 106. By way of example and not limitation, the exhaust chamber 220 may have between one to 16 exhaust vents 106 evenly distributed around the storage body 102 and fluidly connecting the exhaust chamber 220 with the outside environment. In some examples, the exhaust chamber 220 may have greater than 16 exhaust vents 106. The exhaust vents 106 may each have mesh wiring that prevent the dead mosquitoes 206 to be blown out of the exhaust chamber 220. By way of example and not limitation, backup exhaust vents (e.g., mesh wiring) may also be provided with the mosquito trap 100. The exhaust chamber 220 may have additional neutralizing mechanisms for killing mosquitoes 206 who did not die from the rotating blades 208a of the fan system 208. In some examples, the exhaust chamber 220 may have one or more glue boards to trap the living mosquitoes 206 therein until such insects die from the airflow force exerted on them in the exhaust chamber 220 by the fan system 208. In another example, the exhaust chamber 220 may have a shredder with shredding blades to tear apart the living mosquitoes 206 inside the exhaust chamber. In other examples, the exhaust chamber 220 may have LED lights that emit bright lighting on the living mosquitoes 206 inside the exhaust chamber 220 to dehydrate them to death.

The exhaust chamber 220 may have the same horizontal spacing as the first chamber 202a. By way of example and not limitation, the exhaust chamber 220 may have ⅓ to ⅛ the internal volume and height of the first chamber 202a. In some examples, the exhaust chamber 220 may have greater than ⅓ the internal volume and height of the first chamber 202a, and in other examples the exhaust chamber may have less than ⅛ the internal volume and height of the first chamber 202a. As described elsewhere herein, the exhaust chamber 220 may have a side door 503 (see FIG. 5) that may be opened and closed to reach the inside the exhaust chamber 220 for cleaning.

Referring now to FIG. 3, a miniature version of the mosquito trap 300 is shown that may be more viable for use in smaller settings (e.g., apartment balconies) or indoors. The miniature mosquito trap 300 may have the same features and functions as described elsewhere herein. By way of example and not limitation, the internal volume of the first chamber of the mosquito trap 300 of FIG. 3 may range between ¼ to 1 cubic feet. By way of example and not limitation, the internal height of the first chamber of the mosquito trap 300 of FIG. 3 may range between ½ to 2 feet. The internal volumes of the second chamber and the exhaust chamber of the miniature mosquito trap 300 may be fractions of the internal volume of the first chamber, in the fraction ranges described elsewhere herein with respect to the regular-sized mosquito trap 100. The miniature mosquito trap 300 may also have solar panels 302 sticking out of its body to power the trap, as described elsewhere herein. The solar panels 302 may recharge the batteries of the miniature mosquito trap 300, as described elsewhere herein. The solar panels 302 may also be used to determine when the miniature mosquito trap 300 should activate, or adjust its power settings, as described elsewhere herein. Such activation and adjustments may be based on whether the sun is out and shining or not.

The miniature mosquito trap 300 may not have a lid. By way of example and not limitation, the storage body of the miniature mosquito trap 300 may be made from ceramics, polymer (e.g., rigid or rigidly flexible plastic), metal alloy (e.g., steel or aluminum alloy), or composite material (e.g., fiberglass). Similarly, and by way of example and not limitation, the storage body 102 and lid 104 of the mosquito trap 100 of FIG. 1 may be made from ceramics, polymer (e.g., rigid or rigidly flexible plastic), metal alloy (e.g., steel or aluminum alloy), or composite material (e.g., fiberglass).

The night and day operation of the mosquito traps 100, 300 may differ due to the needs of the operator and the behavior of mosquitoes 206. Mosquitoes 206 may be nocturnal insects that search for food sources and reproduction areas at nighttime and also like Aedes mosquitoes search in day or night. Consequently, mosquitoes 206 may be highly active at night and be less active, or inactive, during the day when the sun is out. The fan system 208 of the mosquito traps 100, 300 may, as a result, need to be activated during nighttime and can be deactivated during daytime. Alternatively, the fan system 208 mosquito traps 100, 300 may be activated at a low power and speed setting during the daytime and a high or medium power and speed setting during the nighttime. This may be because the mosquito traps 100, 300 may attract and kill more mosquitoes at nighttime with the mechanisms and functions described elsewhere herein.

Figure 4:
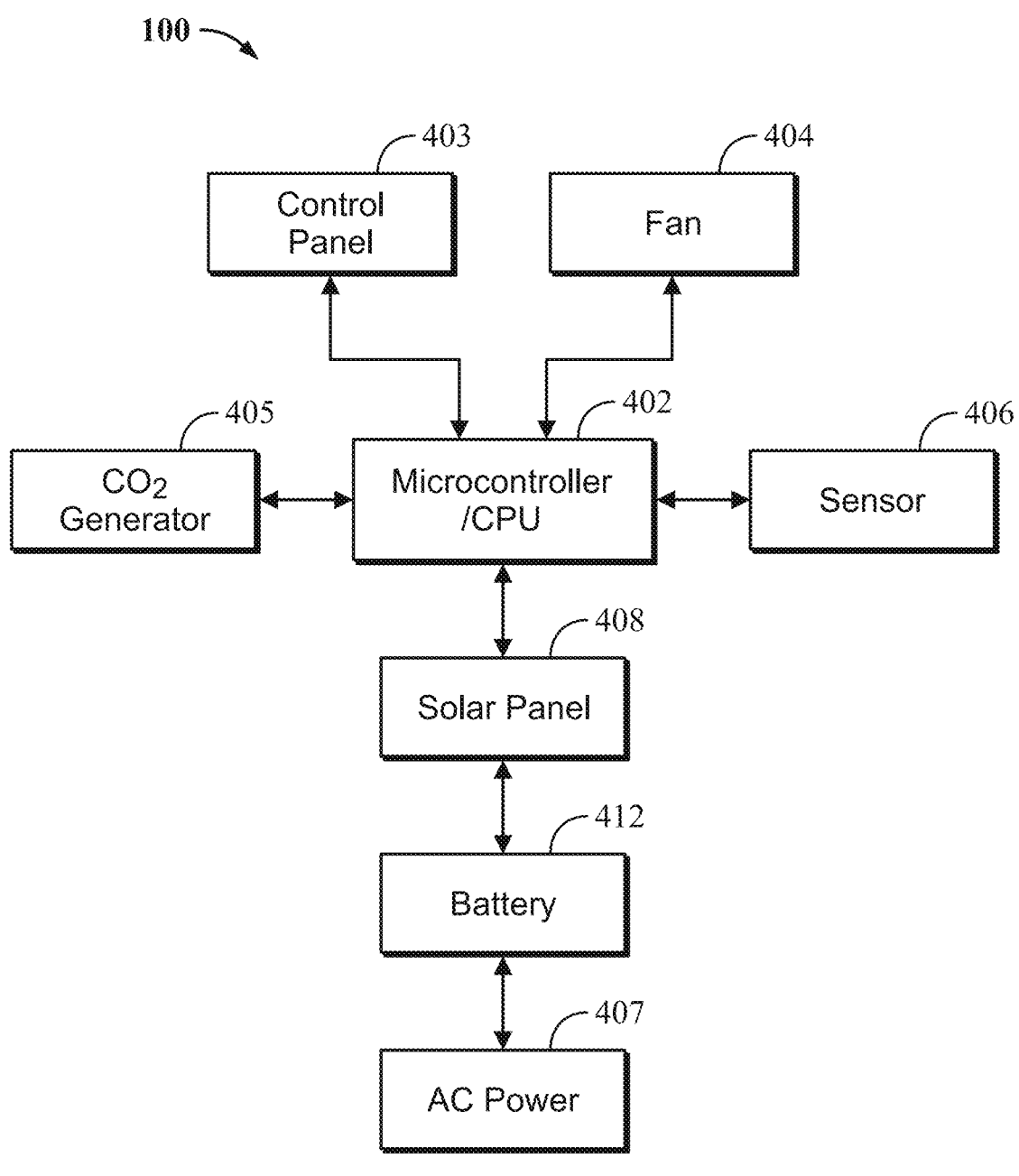
FIG. 4 shows a block diagram of the electrical compo-nents of the mosquito trap.

The activation and deactivation of the fan system 208 of the mosquito traps 100, 300 may be done manually or automatically by a microcontroller 402 (see FIG. 4). Similarly, the power and speed adjustment of the fan system 208 of the mosquito traps 100, 300 (e.g., between low, medium, and high settings) may be done manually or automatically by a microcontroller 402. In some examples, the microcontroller 402 may also activate and deactivate a carbon dioxide generator 405 that may substitute the water tank 216. The microcontroller 402 may also control the rate of the carbon dioxide production of such carbon dioxide generator 405, for example between low, medium, and high carbon dioxide generation.

The manual activation and adjustment of the fan system 208 may be done using a control panel 403 that may be on the mosquito traps 100, 300 or remote from the devices. By way of example and not limitation, the remote control panel 403 may be a mobile device (e.g., smartphone or computer tablet) usable with a mobile software application. The automatic activation and adjustment of the fan system 208, which the microcontroller 402 of the mosquito traps 100, 300 may be designed to carry out may be based on signals generated by one or more sensors 408. The signals generated by the one or more sensors 408 may correspond to a change in the physical properties of the environment either inside or outside of the mosquito traps 100, 300, described elsewhere herein. In other examples, the automatic activation and adjustment of the fan system 208 by the microcontroller 402 may be based on signals generated by the solar panels 408, described elsewhere herein.

In other examples, the automatic activation and adjustment of the fan system 208 by the microcontroller 402 may be based on a timer. The timer may track the time of day and activate the mosquito traps 100, 300, or adjust its power and speed setting, when the timer determines the time of day is close to dusk or nighttime (e.g., 7 or 8 pm). The timer may track the time of day and deactivate the mosquito trap 100, 300, or adjust its power and speed setting, when the timer determines the time of day is close to dawn or daytime (e.g., 7 or 8 am). In another example, the timer may be designed to activate the mosquito trap 100, 300, or adjust its power and speed setting, for an inputted amount of time by the user using the control panel 403. In some examples, the user may use the control panel 403 to input for how long the fan system 208 of the mosquito trap to stay active (at a specific power and speed setting) between one to 24 hours. Such activation time interval may repeat every 24 hours. By way of example and not limitation, the timer may be integrated with the microcontroller 402. By way of example and not limitation, the timer may be a timer switch that is water-resistant or water-proof.

Figure 5:
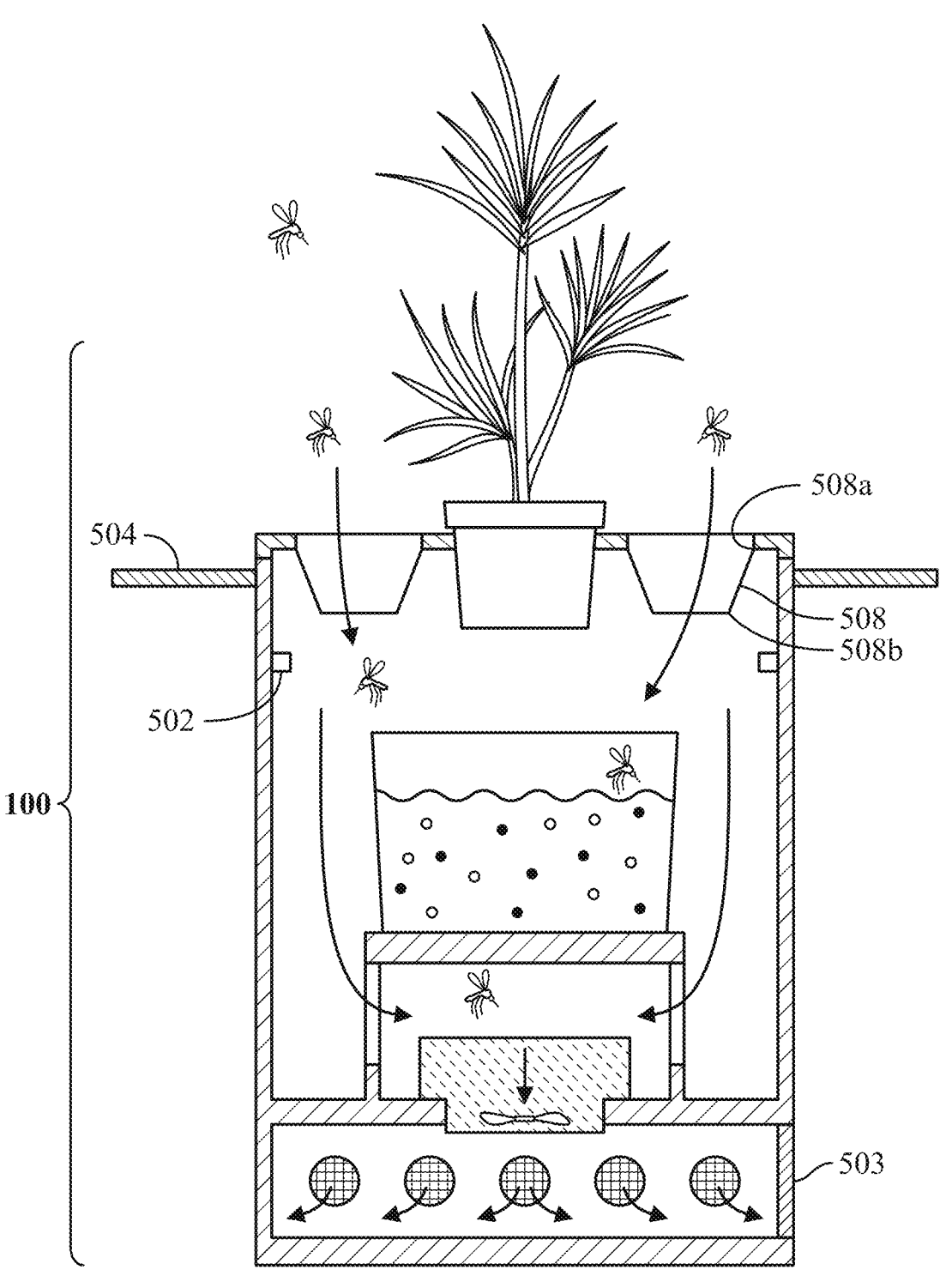
FIG. 5 show a cross-sectional view of another example of the mosquito trap.

Referring now to FIG. 5, and in further reference to FIGS. 2A and 4, a more advanced version of the mosquito trap 100 of FIG. 2A is shown. The mosquito trap 100 of FIG. 5 may have one or more different types of sensors 502 designed to relay signals to the microcontroller 402 of the mosquito trap 100 to help determine when to activate and deactivate the fan system 208 of the mosquito trap 100. The microcontroller 402 of the mosquito trap 100 may also use the signals generated by the one or more sensors 502 to adjust the power and speed setting of the fan system 208. For example, the fan system 208 may initially operate at a low setting to ventilate and spread the scents and carbon dioxide generated by the attractant mechanisms of the trap. When the microcontroller receives a signal from the one or more sensors 502, then the speed and power setting of the fan system 208 may be adjusted to medium or high setting to trap and kill the mosquitoes 206. The usage of the signals generated by the one or more sensors 502 to selectively turn on or adjust the settings of the fan system 208 may help reduce energy used by the mosquito trap 100 and make the device operate more optimally.

By way of example and not limitation, the one or more sensors 502 may be motion sensors inside the first chamber 202*a* of the mosquito trap 100. When the motion sensors detect the presence of the one or more mosquitoes 206 inside the first chamber 202*a* (e.g., by detecting infrared heat or sound waves created by the mosquitoes 206), the motion sensors may relay to the microcontroller 402 to either turn on the fan system 208 or increase the power and speed of the fans. Consequently, the mosquitoes inside the first chamber 202*a* may get trapped and suctioned towards the second chamber 202*b* and the rotating blades 208*a* of the fans 208. The motion sensors may be located inside the first chamber 202*a* and above the open top 216*a* of the water tank 216. In some examples, the motion sensors may be located at a height in-line with the open top 216*a* of the water tank 216. As such, the motion sensors may detect when the mosquitoes 206 are flying to lay eggs 206*a* and prevent that from happening by activating and intensifying the speed and power of the fan system 208. The motion sensors may send activation and adjustment signals to the microcontroller 402 when detecting the presence of a certain number of mosquitoes 206 in the first chamber 202*a* based on infrared heat or mosquito flying sound detection. By way of example and not limitation, the motion sensors may signal the microcontroller 402 to activate the fan system 208 when detecting one to 20 mosquitoes 206 in the first chamber 202*a*. In some examples, the motion sensors may signal the microcontroller 402 to activate the fan system 208 when detecting more than 20 mosquitoes 206 in the first chamber 202*a*.

In other examples, the one or more sensors 502 may be humidity sensors. Mosquitoes 206 prefer to be active and search for food sources and reproduction sites in humid environments. Consequently, when the humidity sensor senses high humidity (e.g., somewhere between 40% to 100% humidity), such sensors may signal the microcontroller 402 to activate the fan system 208 or adjust the speed and power of the fan system 208 to medium or high from a low setting. Consequently, the fan system 208 may better spread attractants and also trap mosquitoes 206 when the sensors detect high humidity. The humidity sensors may be inside the first chamber 202*a*, to detect the humidity inside of the chamber, or outside on the storage body 102, to detect the humidity of the surrounding environment.

In other examples, the one or more sensors 502 may be temperature sensors. Mosquitoes 206 prefer to be active and search for food sources and reproduction sites in warm weather. Consequently, when the temperature sensor senses warm temperature (e.g., somewhere between 70 to 100 degrees Fahrenheit), such sensor may signal the microcontroller 402 to activate the fan system 208 or adjust the speed and power of the fan system 208 to medium or high from a low setting. Consequently, the fan system 208 may better spread attractants and also trap mosquitoes 206 when the sensors detect warm temperatures. The temperature sensors may be inside the first chamber 202*a*, to detect the temperature of the inside of such chamber, or outside on the storage body 102, to detect the temperature of the surrounding environment.

In other examples, the one or more sensors 406 may be light detecting sensors (e.g., pyranometer). The light detecting sensors may be placed outside of the storage body 102, for example at where the solar panels 504 of the device are located at in FIG. 5. The light detecting sensors may be configured to detect the presence of light (e.g., sunlight). When the light detecting sensor detects the presence of light, such sensor may send a signal to the microcontroller 402 to maintain the fan system 208 at a low speed and power setting, or to keep the fan system 208 deactivated. When the light detecting sensor does not detect light, such sensor may send a signal to the microcontroller 402 to adjust the fan system 208 at a medium or high speed and power setting, or to activate the device from the deactivated mode. In other examples, when the light detecting sensor does not detect light, the sensor does not send a signal to the microcontroller 402, and the absence of signal from the light sensor may cause the microcontroller 402 to active the fan system or to adjust the speed and power setting to medium or high from the low setting.

The different types of sensors 406, described elsewhere herein, may be used in conjunction with each other to operate the mosquito trap 100. By way of example and not limitation, the light detecting sensor may be used to activate and deactivate the mosquito trap 100, and the motion sensor may be used to switch the setting of the fan system between low, medium, and high when the motion sensor detects one or more mosquitoes 206 are inside the first chamber 202*a*. In the aforementioned example, the light detecting sensor may be substituted by the solar panels 408 to detect whether sun is shining or not and to deactivate and activate the fan system 208 of the mosquito trap 100 accordingly.

As shown in FIG. 5, and with further reference to FIG. 4, the mosquito trap 100 may have one or more solar panels 504 that recharge the batteries 412 of the device. The solar panels 504 may be the same as the solar panels 408 of FIG. 4. The solar panels 504 may be attached to the storage body 102 or on the lid 104 of the mosquito trap 100. As shown in FIG. 5, the solar panels 504 may extend away from the storage body 102 and have the shape of wing structures. The solar panels 504 may be proximate to the lid 104 of the mosquito trap 100. In other examples, the solar panels 504 may be proximate to the exhaust chamber 220 of the mosquito trap 100. In other examples, the solar panels 504 may be integrated on the outside surfaces of the lid 104 and the storage body 102 of the mosquito trap 100. By way of example and not limitation, the solar panels 504 may be thin film, monocrystalline, or polycrystalline solar panels. In other examples, the one or more batteries 412 of the mosquito trap 100 may be charged directly from another electric power source, such as an AC power source 407 (see FIG. 4) that may come from a power outlet of a building.

In some examples, and as shown in FIG. 4, the solar panels 408 may be in communication with the microcontroller 402 of the mosquito trap 100 and act as sensors to operate the fan system 208, as described elsewhere herein. When the solar panels 408 are generating electricity from sunlight exposure and recharging the batteries 412, such information may be relayed to the microcontroller 402 to turn off or operate the fan system 208 at a low speed and power setting. When the solar panels 408 are not generating electricity and not exposed to sunlight, such information may be relayed to the microcontroller 402 to turn on or operate the fan system 208 at a medium or high speed and power setting. As described elsewhere herein, mosquitoes 206 may be nocturnal insects and the mosquito trap 100 may need to operate at a higher speed and power setting at night since more mosquitoes are flying and being active.

As shown in FIG. 5, the air inlets 110 of the first chamber 202_a_ may protrude inward in a cone-shape manner. The cone-shaped extension 508 of the air inlets 110 may have an outer opening 508_a_ that narrows conically to a narrow inner opening 508_b_. As such, the mosquitoes 206 may have a harder time escaping the first chamber 202_a_ once in there, especially with the suction flow 204 of the fan system 208 being active on a medium or high setting. By way of example and not limitation, the narrow inner opening 508_b_ of the cone-shaped inlet extension 508 may be ¼ to ¾ as wide as the outer opening 508_a_.

As shown in FIG. 5, the storage body 102 of the mosquito trap 100 may have a trap door 503 for the exhaust chamber 220. The trap door 503 may be removable, pivoting, or slidable to open and close. The trap door 503 may allow the user to access the inside of the exhaust chamber 220 to clean the dead mosquitoes 206 inside such chamber.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A mosquito trap, comprising:
a storage body having a first chamber with a first volume and a second chamber with a second volume, the first chamber being fluidly connected to an outside environment of the storage body by one or more air inlets proximate to a top portion of the storage body, the first chamber being fluidly connected to the second chamber, the second chamber being fluidly connected to the outside environment by one or more exhaust vents proximate to a bottom portion of the storage body;
a mosquito attracting plant sticking out of the storage body, the mosquito attracting plant being proximate to the one or more air inlets;
a water tank inside the first chamber of the storage body, the water tank having a fluid mixture made of water, an attractant substance for attracting mosquitoes, and a toxin for neutralizing larvae of the mosquitoes; and
a fan in the storage body and below the water tank, the fan configured to create a suction airflow from the one or more air inlets to the one or more exhaust vents, the fan is configured to capture the mosquitos entering through the one or more air inlets on top of the storage body and configured to direct the mosquitos to both the water tank then to the fan below the water tank and configured to kill the mosquitos upon contact or by sending them into the lower chamber where they die by the airflow stuck against the exhaust vents in the lower chamber.

2. The mosquito trap of claim 1, wherein the second chamber is within the first chamber.

3. The mosquito trap of claim 2, wherein the water tank is above the second chamber.

4. The mosquito trap of claim 1, wherein the one more air inlets are located on a lid placed on the top portion of the storage body.

5. The mosquito trap of claim 4, wherein the one or more air inlets are a plurality of air inlets surrounding the mosquito attracting plant.

6. The mosquito trap of claim 1, wherein the fan is in the second chamber.

7. The mosquito trap of claim 1, wherein the mosquito attracting plant is either a papyrus plant or a taro plant.

8. The mosquito trap of claim 1, wherein the fan is an inline fan.

\* \* \* \* \*